(12) United States Patent
Ueda et al.

(10) Patent No.: US 8,285,117 B2
(45) Date of Patent: Oct. 9, 2012

(54) INFORMATION PROCESSING APPARATUS, DISK, INFORMATION PROCESSING METHOD, AND PROGRAM

(75) Inventors: Kenjiro Ueda, Kanagawa (JP); Katsumi Muramatsu, Tokyo (JP); Masanobu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 12/533,514

(22) Filed: Jul. 31, 2009

(65) Prior Publication Data

US 2010/0046915 A1    Feb. 25, 2010

(30) Foreign Application Priority Data

Aug. 22, 2008 (JP) ................................. 2008-213538

(51) Int. Cl.
*H04N 9/80* (2006.01)
(52) U.S. Cl. ........................................ 386/248; 386/259
(58) Field of Classification Search .................. None
See application file for complete search history.

(56) References Cited

U.S. PATENT DOCUMENTS

| | | | |
|---|---|---|---|
| 7,336,887 B2 * | 2/2008 | Satoh et al. | 386/252 |
| 7,596,227 B2 * | 9/2009 | Illowsky et al. | 380/277 |
| 2003/0009681 A1 * | 1/2003 | Harada et al. | 713/193 |
| 2003/0212888 A1 * | 11/2003 | Wildish et al. | 713/158 |
| 2005/0105884 A1 * | 5/2005 | Satoh et al. | 386/69 |
| 2006/0015937 A1 * | 1/2006 | Illowsky et al. | 726/18 |
| 2006/0062073 A1 * | 3/2006 | Kitani et al. | 365/232 |
| 2007/0247985 A1 | 10/2007 | Ueda et al. | |
| 2008/0109440 A1 * | 5/2008 | Uchiyama | 707/9 |

FOREIGN PATENT DOCUMENTS

| | | |
|---|---|---|
| JP | 2002-244552 | 8/2002 |
| JP | 2003-234728 | 8/2003 |
| JP | 2004-145798 | 5/2004 |
| JP | 2006-53644 | 2/2006 |
| JP | 2006-72688 | 3/2006 |
| JP | 2006-260614 | 9/2006 |
| JP | 2008-84445 | 4/2008 |
| JP | 2008-103007 | 5/2008 |
| JP | 2008-131557 | 6/2008 |
| JP | 2008-140440 | 6/2008 |
| WO | WO 2006/085647 A1 | 8/2006 |

\* cited by examiner

*Primary Examiner* — William C Vaughn, Jr.
*Assistant Examiner* — Gelek W Topgyal
(74) *Attorney, Agent, or Firm* — Oblon, Spivak, McClelland, Maier & Neustadt, L.L.P.

(57) ABSTRACT

An information processing apparatus includes a data processing unit that verifies data recorded on a disk and reproduces content recorded on the disk if a verification condition is satisfied. The data processing unit verifies the validity of an ID inserter that has recorded, on the disk, an ID corresponding to the disk. The data processing unit acquires an ID inserter certificate containing an apparatus ID of the ID inserter that has recorded the ID corresponding to the disk on the disk and an ID inserter blacklist having apparatus IDs of invoked ID inserters registered therein, determines whether the apparatus ID contained in the ID inserter certificate is registered in the ID inserter blacklist so as to verify the validity of the ID inserter that has recorded the ID corresponding to the disk, and stops reproduction of the content if it is determined that the ID inserter is not valid.

9 Claims, 8 Drawing Sheets

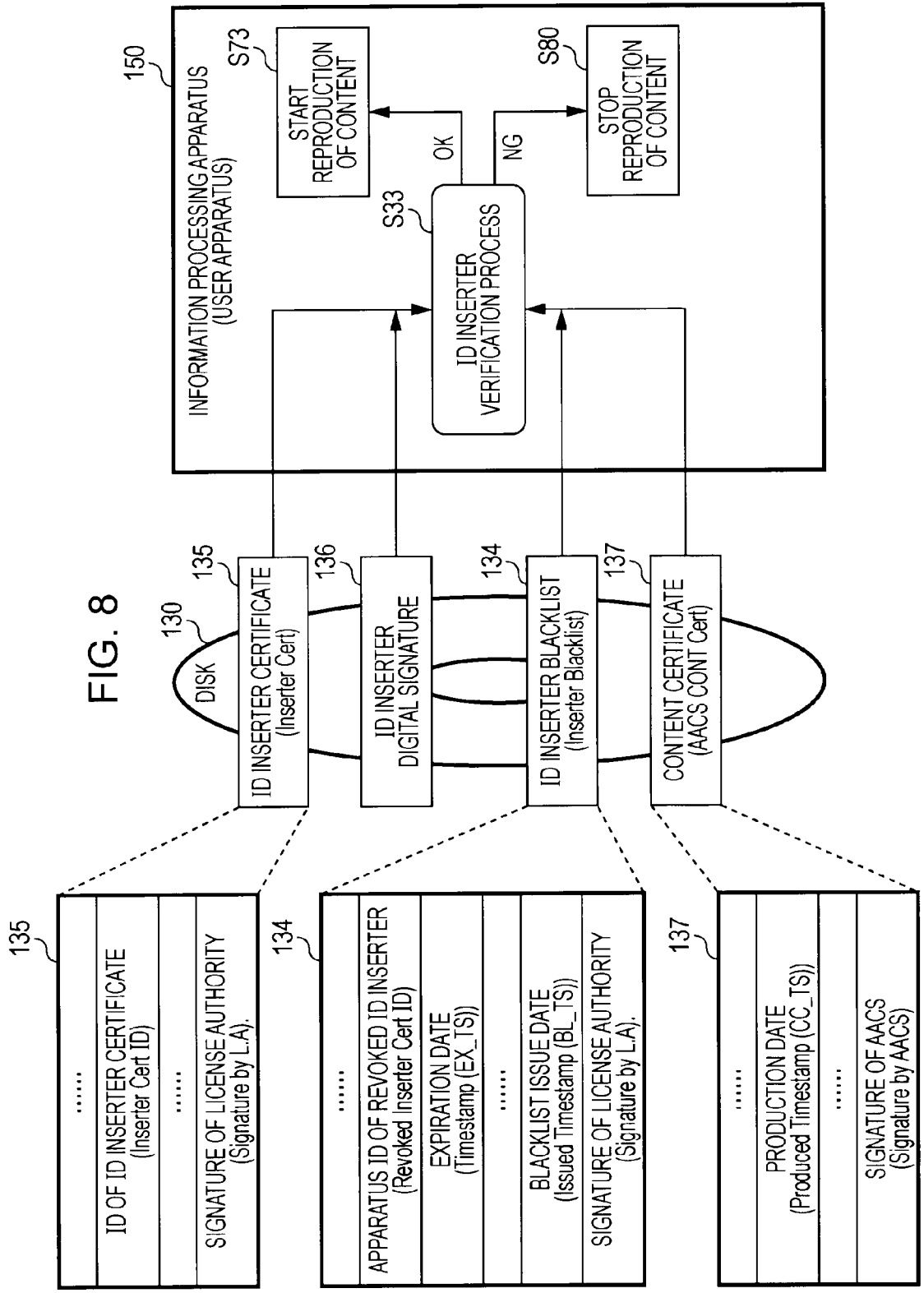

INFORMATION PROCESSING APPARATUS, DISK, INFORMATION PROCESSING METHOD, AND PROGRAM

BACKGROUND OF THE INVENTION

1. Field of the Invention

The present invention relates to an information processing apparatus, a disk, an information processing method, and a program and, in particular to, an information processing apparatus, a disk, an information processing method, and a program that control usage of content recorded in an information recording medium.

2. Description of the Related Art

In order to record content, disks, such as a digital versatile discs (DVD) and Blu-ray Discs (trade name) have been used as recording media. For example, movie content is recorded in a disk (e.g., a ROM disk) and provided to a user. In many cases, the copyright and distribution rights of the content are owned by the author and the seller. For example, in order to protect the content against unauthorized copying, the use of the content is restricted.

An advanced access control system (AACS) has been developed as a copyright management system. Content recorded on the disk that complies with such a copyright management system is recorded in the form of encrypted data written on a unit-by-unit basis. When reproducing content recorded on a disk, an information processing apparatus decrypts the content using a unit key provided for each of the units. Such a recording and reproduction method for encrypted content is described in, for example, Japanese Unexamined Patent Application Publication No. 2006-72688.

In order to provide more strict use of content, a control method in which a variety of types of identification information (ID) is used when content is reproduced has been developed. In this method, upon reproducing content, an information processing apparatus acquires an ID associated with a disk, an apparatus, and the content. Thereafter, the information processing apparatus verifies the ID and generates a key using the ID.

For example, a disk has the following identification information (IDs) recorded therein:

(a) a media ID which is unique to the disk (also referred to as a pre-recorded media serial number (PMSN)), (b) a volume ID which is set on a title-by-title basis, and (c) a content certification ID which is identification information of the content certificate provided to content recorded on a disk.

A reproduction apparatus reads at least one of the above-described identification information (IDs (a) to (c)) and performs processing in a predetermined sequence, for example, key generation and content decryption. Thus, the content can be used. In addition, the reproduction apparatus may send the identification information (IDs) to a server. After the server verifies the IDs, the reproduction apparatus may receive various additional content and service data from the server.

By using such ID information and allowing the content to be reproduced only when a predetermined ID is used, disks or apparatuses that use the content can be limited.

However, if, for example, unauthorized IDs are recorded on disks in a disk manufacturing plant, the disks having the unauthorized IDs thereon are distributed. Therefore, content may be illegally used.

SUMMARY OF THE INVENTION

Accordingly, the present invention provides an information processing apparatus, a disk, an information processing method, and a program that protects the disk against unauthorized recording of identification information (an ID) on the disk and illegal use of the disk.

According to an embodiment of the present invention, an information processing apparatus includes a data processing unit configured to verify data recorded on a disk and reproduce content recorded on the disk if a verification condition is satisfied. The data processing unit verifies the validity of an ID inserter that has recorded, on the disk, an ID corresponding to the disk, and the data processing unit acquires, from the disk, an ID inserter certificate containing an apparatus ID of the ID inserter that has recorded the ID corresponding to the disk on the disk and an ID inserter blacklist having apparatus IDs of invoked ID inserters registered therein, determines whether the apparatus ID contained in the ID inserter certificate is registered in the ID inserter blacklist so as to verify the validity of the ID inserter that has recorded, on the disk, the ID corresponding to the disk, and stops reproduction of the content recorded on the disk if it is determined that the ID inserter is not valid.

When the apparatus ID contained in the ID inserter certificate is not registered in the ID inserter blacklist, the data processing unit can read a content certificate that is recorded on the disk and that certifies the validity of the content and compare a content certificate issue date contained in the content certificate with an issue date of the ID inserter blacklist. When the issue date of the ID inserter blacklist is earlier than the content certificate issue date and if a difference between the issue date of the ID inserter blacklist and the content certificate issue date is greater than or equal to a predetermined threshold value, the data processing unit can stop reproduction of the content recorded on the disk.

When the apparatus ID contained in the ID inserter certificate is registered in the ID inserter blacklist, the data processing unit can read a content certificate that is recorded in the disk and that certifies the validity of the content and compare a content certificate issue date contained in the content certificate with an expiration date of the validity of the ID inserter contained in the ID inserter blacklist. If an expiration date of the validity of the ID inserter is earlier than the content certificate issue date, the data processing unit can stop reproduction of the content recorded on the disk.

The data processing unit can verify a digital signature of the ID inserter certificate and a digital signature of the ID inserter blacklist. If the data processing unit is unable to verify that the ID inserter certificate and the ID inserter blacklist are not tampered with and identity of a signer of the digital signature is trusted, the data processing unit can stop reproduction of the content recorded on the disk.

The data processing unit can verify a digital signature of the content certificate. If the data processing unit is unable to verify that the content certificate is not tampered with and the identity of a signer of the digital signature is trusted, the data processing unit can stop reproduction of the content recorded on the disk.

The disk can further contain an ID inserter digital signature representing signature data based on a private key of the ID inserter for data including the ID inserter certificate, and the data processing unit can verify the ID inserter digital signature. If the data processing unit is unable to verify that the data is not tampered with and an identity of a signer of the digital signature is trusted, the data processing unit can stop reproduction of the content recorded on the disk.

The ID corresponding to the disk can be a volume ID that is unique to a title of the content recorded on the disk.

According to another embodiment of the present invention, a disk stores content, an ID corresponding to the disk, an ID inserter certificate containing an apparatus ID of an ID inserter that has recorded the ID corresponding to the disk on the disk, and an ID inserter blacklist having apparatus IDs of invoked ID inserters registered therein. An information processing apparatus that reproduces the content determines whether the apparatus ID contained in the ID inserter certificate is registered in the ID inserter blacklist so as to verify the validity of the ID inserter that has recorded, on the disk, the ID corresponding to the disk, and stops reproduction of the content recorded on the disk if it is determined that the ID inserter is not valid.

According to still another embodiment of the present invention, an information processing method for use in an information processing apparatus is provided. The method including the step of verifying data recorded on a disk and reproducing content recorded on the disk if a verification condition is satisfied using a data processing unit of the information processing apparatus. The step of verifying data recorded on a disk and reproducing content recorded on the disk involves acquiring an ID inserter certificate containing an apparatus ID of the ID inserter that has recorded the ID corresponding to the disk on the disk and an ID inserter blacklist having apparatus IDs of invoked ID inserters registered therein and determining whether the apparatus ID contained in the ID inserter certificate is registered in the ID inserter blacklist so as to verify the validity of the ID inserter that has recorded, on the disk, the ID corresponding to the disk and stopping reproduction of the content recorded on the disk if it is determined that the ID inserter is not valid.

According to yet still another embodiment of the present invention, a program for causing an information processing apparatus to perform data processing is provided. The program includes program code for causing a data processing unit of the information processing apparatus to perform the step of verifying data recorded on a disk and reproducing content recorded on the disk if a verification condition is satisfied. The step of verifying data recorded on a disk and reproducing content recorded on the disk involves acquiring an ID inserter certificate containing an apparatus ID of the ID inserter that has recorded the ID corresponding to the disk on the disk and an ID inserter blacklist having apparatus IDs of invoked ID inserters registered therein and determining whether the apparatus ID contained in the ID inserter certificate is registered in the ID inserter blacklist so as to verify the validity of the ID inserter that has recorded, on the disk, the ID corresponding to the disk and stopping reproduction of the content recorded on the disk if it is determined that the ID inserter is not valid.

The program can be provided to, for example, a general-purpose system that can execute various computer-readable program code using a recording medium and communication medium. By providing such computer-readable program, processing in accordance with the program can be realized.

Further features and advantages of the present invention will become apparent from the following detailed description of exemplary embodiments with reference to the attached drawings. As used herein, the term "system" refers to a logical combination of a plurality of apparatuses. The apparatuses having a variety of configuration are not necessarily included in one body.

According to the embodiment of the invention, a configuration can be provided in which data recorded on a disk is verified and content recorded on the disk is reproduced if a verification condition is satisfied. In the configuration, the validity of the data recorded on the disk is verified by verifying the validity of an ID inserter that has recorded, on the disk, an ID corresponding to the disk. More specifically, the following IDs are acquired from the disk: an ID inserter certificate containing an apparatus ID of the ID inserter that has recorded the ID corresponding to the disk on the disk and an ID inserter blacklist having apparatus IDs of invoked ID inserters registered therein. It is then determined whether the apparatus ID contained in the ID inserter certificate is registered in the ID inserter blacklist. In addition, the issue date of the ID inserter certificate is compared with the issue date of the ID inserter blacklist or the date when ID inserter was revoked so as to verify the validity of the ID inserter. If it is determined that the ID inserter is not valid, reproduction of the content recorded on the disk is stopped. According to the configuration, the use of content stored in a disk generated using an invalid ID inserter can be prevented.

BRIEF DESCRIPTION OF THE DRAWINGS

FIG. 8 is a diagram illustrating the ID inserter verification process performed by the information processing apparatus according to the embodiment.

DESCRIPTION OF THE PREFERRED EMBODIMENTS

An information processing apparatus, a disk, an information processing method, and a program according to an embodiment of the present invention are described in detail below with reference to the accompanying drawings.

Figure 1:
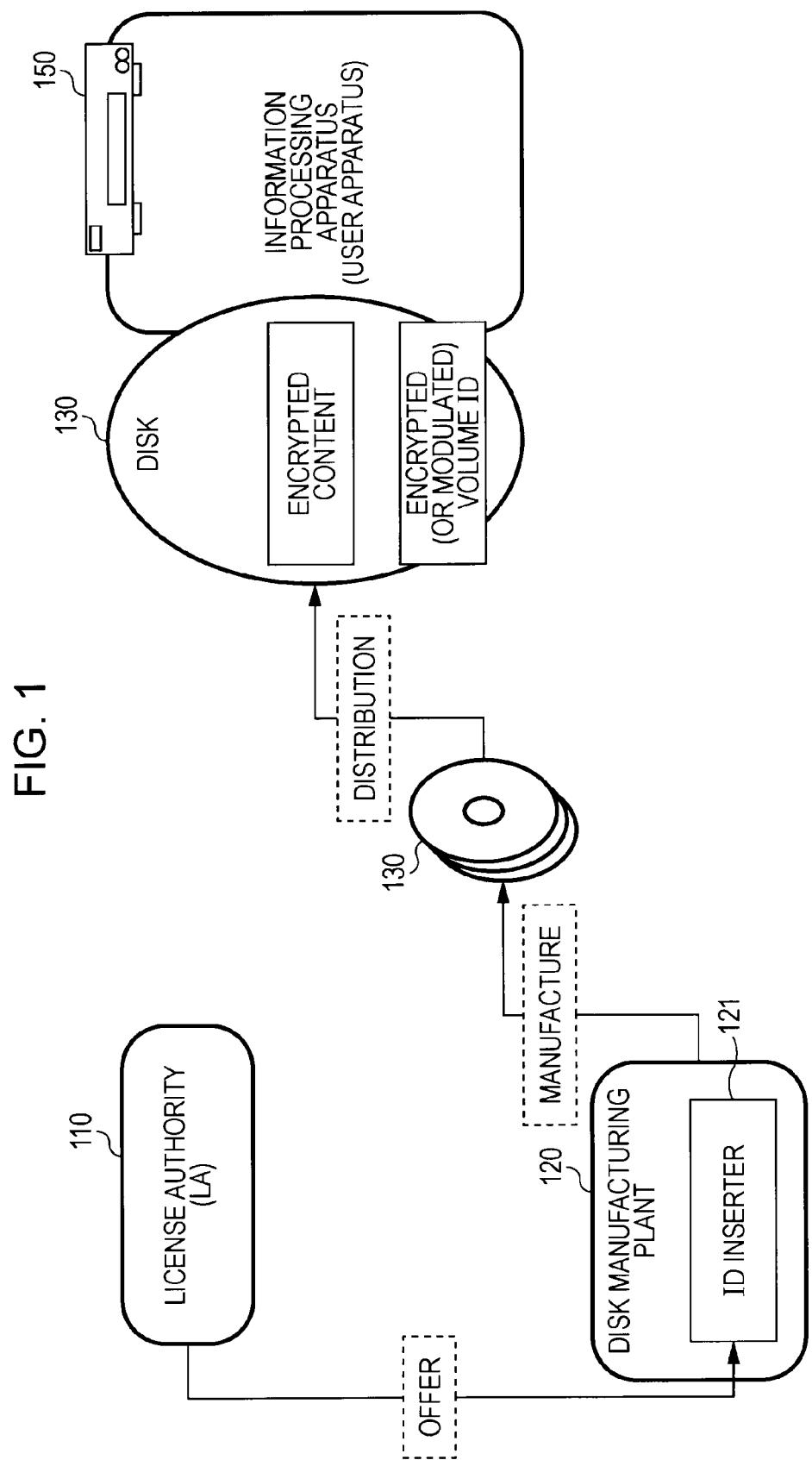
FIG. 1 is a schematic illustration of an embodiment of the present invention.

The embodiment of the present invention is schematically illustrated first with reference to FIG. 1. FIG. 1 illustrates a relationship among a license authority 110, a disk manufacturing plant 120, a disk 130, and an information processing apparatus 150. The license authority 110 provides, to the disk manufacturing plant 120 that manufactures disks, an ID inserter 121 that can record an authorized ID (i.e., an ID inserter 121 having a license).

In the disk manufacturing plant 120, an identifier (ID) is recorded on a produced disk using the ID inserter 121 authorized by the license authority 110 (i.e., the ID inserter 121 having a valid license). According to the present embodiment, a disk-based ID recorded on the disk 130 is a volume ID which is unique to a content title recorded on the disk 130. A plurality of disks that contain content having the same content title have the same volume ID recorded thereon.

Note that the disk-based ID recorded on the disk 130 is encrypted or modulated. Accordingly, it is difficult to analyze the ID through an ordinary readout process. As shown in FIG. 1, in addition to the encrypted content, a volume ID is recorded on the disk 130.

A user purchases the disk 130 and reproduces the content using the information processing apparatus (a user apparatus)

150 that decrypts the content. In a content reproduction process, the information processing apparatus 150 reads the disk-based ID (the volume ID) and generates a key to be applied to decryption of the encrypted content contained in the disk 130.

In the configuration of the present embodiment, the information processing apparatus (the user apparatus) 150 determines whether the ID inserter 121 that has recorded the ID on the disk 130 is an authorized apparatus, that is, whether the ID inserter 121 has a valid license. If the ID inserter 121 is not an authorized apparatus, the information processing apparatus 150 does not reproduce the content. When the ID inserter 121 is an authorized apparatus and if an additional condition is satisfied, reproduction of the content is allowed.

Figure 2:
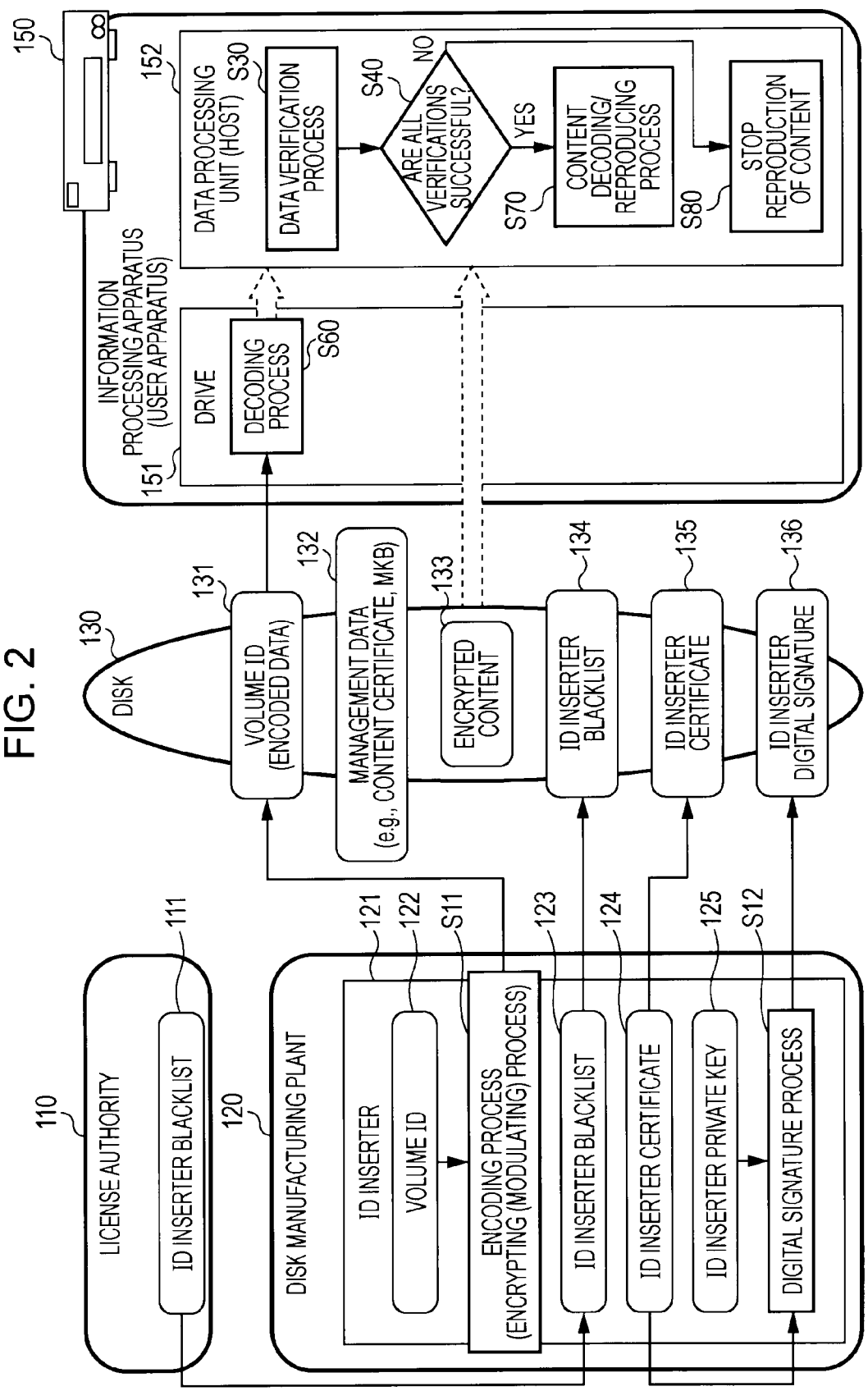
FIG. 2 illustrates exemplary configuration and processing sequence according to the embodiment.

Exemplary configuration and processing sequence according to the present embodiment are described next with reference to FIG. 2. Like FIG. 1, FIG. 2 illustrates a relationship among the license authority 110, the disk manufacturing plant 120, the disk 130, and the information processing apparatus 150. The license authority 110 provides, to the disk manufacturing plant 120 in which disks are manufactured, an ID inserter 121 that can record an authorized ID.

In the disk manufacturing plant 120, an identifier (ID) is recorded on a produced disk using the ID inserter 121 authorized by the license authority 110 (i.e., the ID inserter 121 having a valid license). This ID is a volume ID 122 which is unique to a content title recorded on the disk 130.

For example, a random number generated in the disk manufacturing plant 120 can be used as the volume ID 122. In step S11 shown in FIG. 2, the ID inserter 121 performs a predetermined encryption process or modulation process on the volume ID 122 so as to generate an encoded volume ID for recording. The encoded volume ID (i.e., a volume ID 131 shown in FIG. 2) is recorded on the disk 130.

The license authority 110 provides ID inserters having a variety of licenses to a variety of disk manufacturing plants. The license authority 110 has an ID inserter blacklist 111. The ID inserter blacklist 111 contains revocation information regarding ID inserters that have recorded invalid IDs.

More specifically, the ID inserter blacklist 111 contains identification information indicating a revoked ID inserter (an apparatus ID) and the date when the inserter was revoked. The ID inserter blacklist 111 is updated at appropriate time points. For example, when a disk having an unauthorized ID recorded thereon is found in a market, the ID inserter that has recorded the ID is identified. Thus, the identification information (the apparatus ID) of the identified inserter is registered in the ID inserter blacklist 111.

The license authority 110 provides the ID inserter blacklist 111 to the disk manufacturing plant 120 as an ID inserter blacklist 123. In the disk manufacturing plant 120, the ID inserter blacklist 123 is recorded on the disk 130 using the ID inserter 121 as an ID inserter blacklist 134 shown in FIG. 2.

Figure 3:
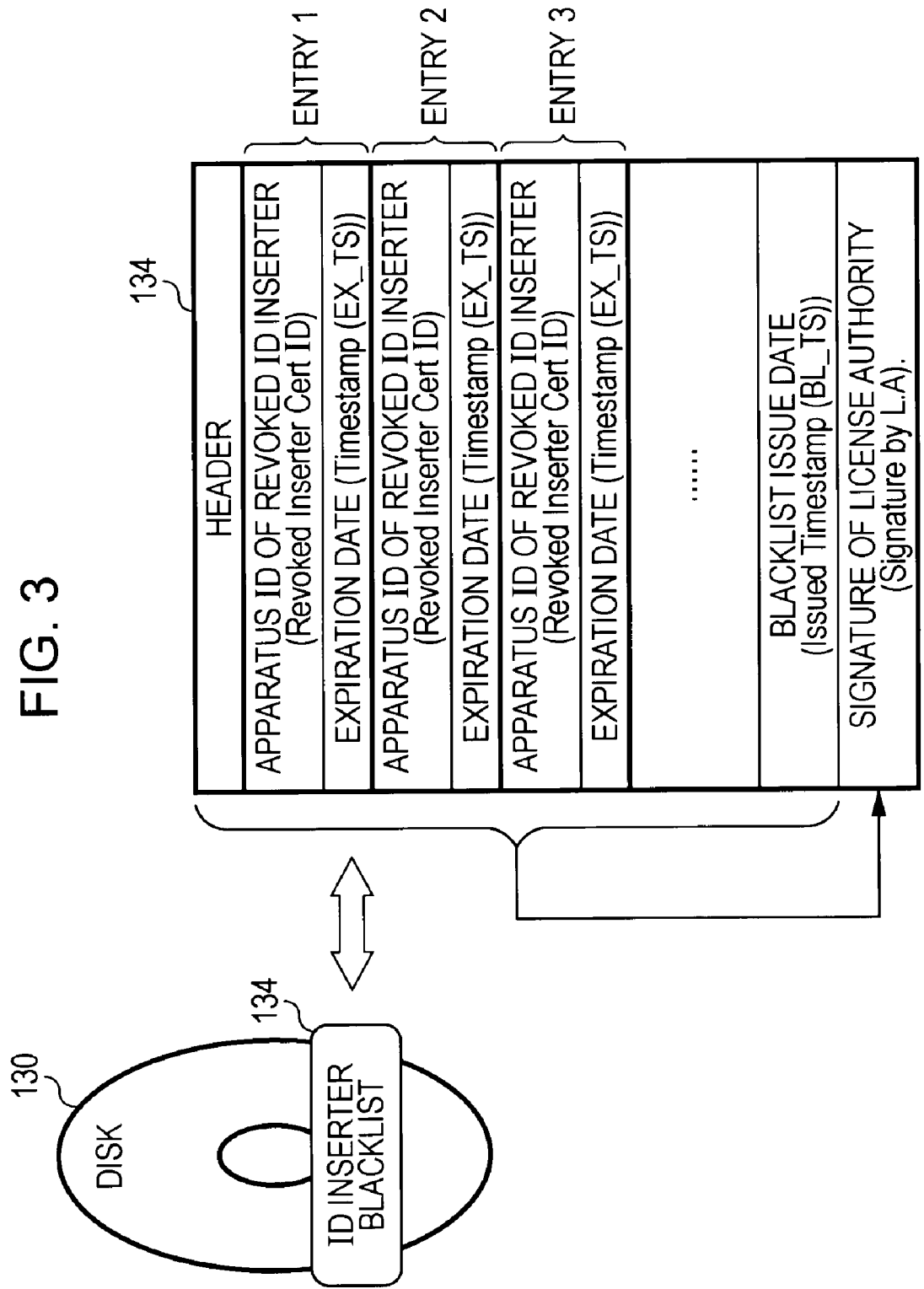
FIG. 3 illustrates an exemplary data structure of an ID inserter blacklist recorded on a disk.

FIG. 3 illustrates an exemplary data structure of the ID inserter blacklist 134 recorded on the disk 130. As shown in FIG. 3, the ID inserter blacklist 134 includes the following data items:

(1) the apparatus ID of a revoked inserter ("Revoked Inserter Cert ID"), and (2) revocation date ("Timestamp (EX_TS)").

The two data items form a pair, and each entry contains a pair. In addition, the issue date of the blacklist and a digital signature generated using a private key of the license authority 110 are affixed to the recorded data. By verifying the digital signature, it can be verified whether the ID inserter blacklist is not tampered with and whether the identity of the signer is trusted.

Referring back to FIG. 2, the ID inserter 121 in the disk manufacturing plant 120 further records an ID inserter certificate 124 on the disk 130 as an ID inserter certificate 135 shown in FIG. 2.

Figure 4:
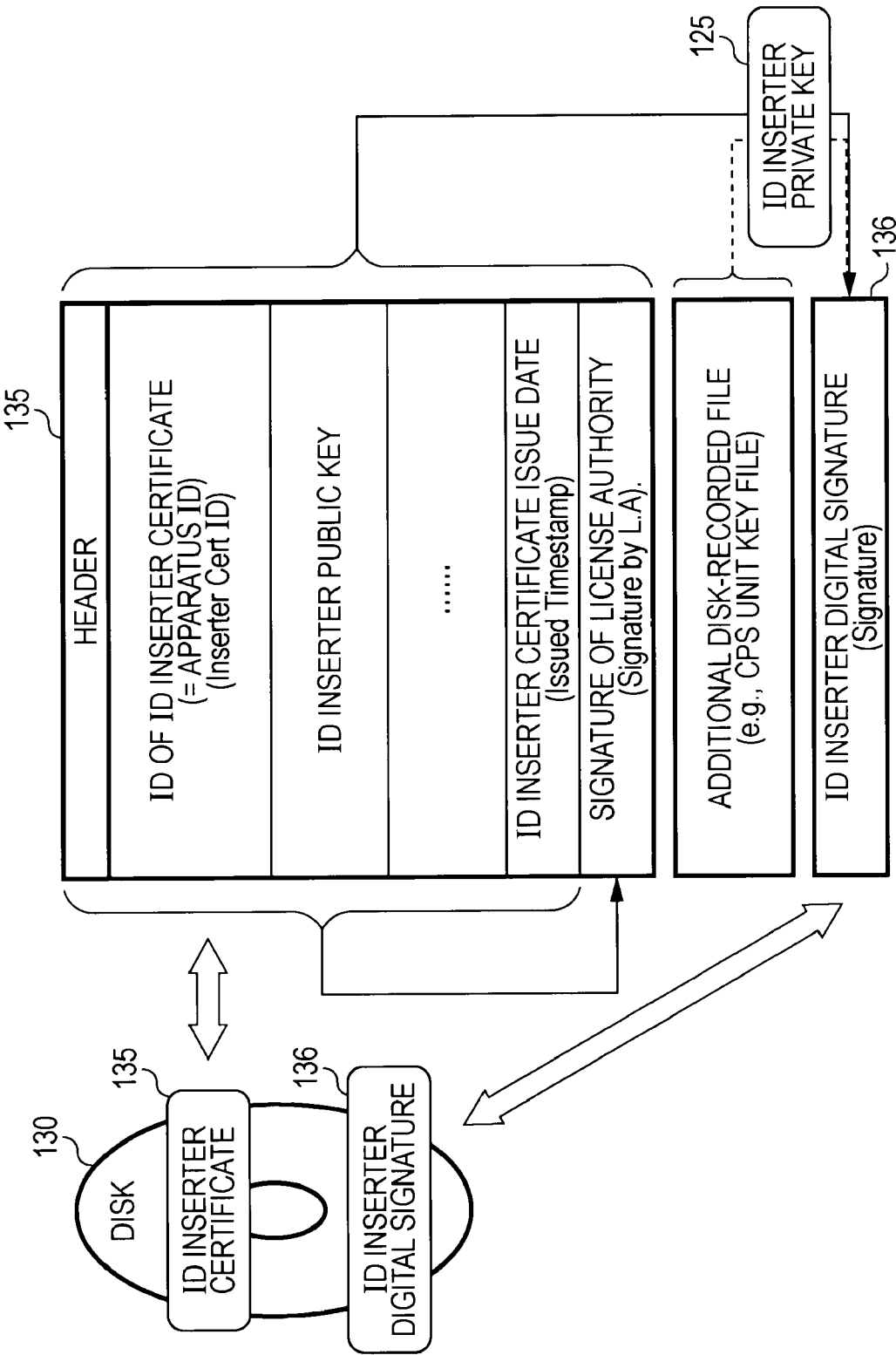
FIG. 4 illustrates an exemplary data structure of an ID inserter certificate recorded on the disk.

FIG. 4 illustrates an exemplary data structure of the ID inserter certificate 135 recorded on the disk 130. As shown in FIG. 4, the ID inserter certificate 135 includes the following data items:

(1) ID inserter certificate ID of the ID inserter that has executed ID recording (=the apparatus ID), and (2) the public key of the ID inserter that has executed ID recording.

In addition, the issue date of the ID inserter certificate and a digital signature generated using a private key of the license authority 110 are affixed to the recorded data. By verifying the digital signature, it can be verified whether the ID inserter certificate is not tampered with and whether the identity of the signer is trusted.

Referring back to FIG. 2, in step S12, the ID inserter 121 in the disk manufacturing plant 120 further performs a digital signature process on the ID inserter certificate 124 using an ID inserter private key 125. The ID inserter 121 stores the digital signature data in the disk 130 as an ID inserter digital signature 136 shown in FIG. 2.

FIG. 4 further illustrates an exemplary data structure of the ID inserter digital signature 136 recorded on the disk 130. As shown in FIG. 4, the ID inserter digital signature 136 is generated by applying the ID inserter private key 125 to the ID inserter certificate 135.

Note that, as shown in FIG. 4, the ID inserter digital signature 136 may be generated by concatenating an additional disk-recorded file of the ID inserter certificate 135 with the ID inserter certificate 135 so as to generate data to which a digital signature is affixed and performing the digital signature generating process on the concatenated data.

For example, the ID inserter digital signature 136 may be generated by concatenating a disk-recorded file such as a CPS unit key file including a key applied to a decryption process of encrypted content to be recorded on a disk with the ID inserter certificate 135 so as to generate data to which a digital signature is affixed and performing the digital signature generating process.

By verifying the digital signature, it can be verified whether the ID inserter certificate and an additional file recorded on the disk are not tampered with and whether the identity of the signer is trusted.

Referring back to FIG. 2, the ID inserter 121 in the disk manufacturing plant 120 records, on the disk 130, the encoded volume ID 131, the ID inserter blacklist 134, the ID inserter certificate 135, and the ID inserter digital signature 136. Furthermore, in the disk manufacturing plant 120, encrypted content 133 and management data 132 corresponding to the encrypted content 133 are recorded on the disk 130.

The management data 132 corresponding to the encrypted content 133 contains, for example, a content certificate that certifies the validity of the content, a CPS unit key file used for decrypting the content, and a media key block (MKB) serving as a key block for computing a media key used for decrypting the content.

Figure 5:
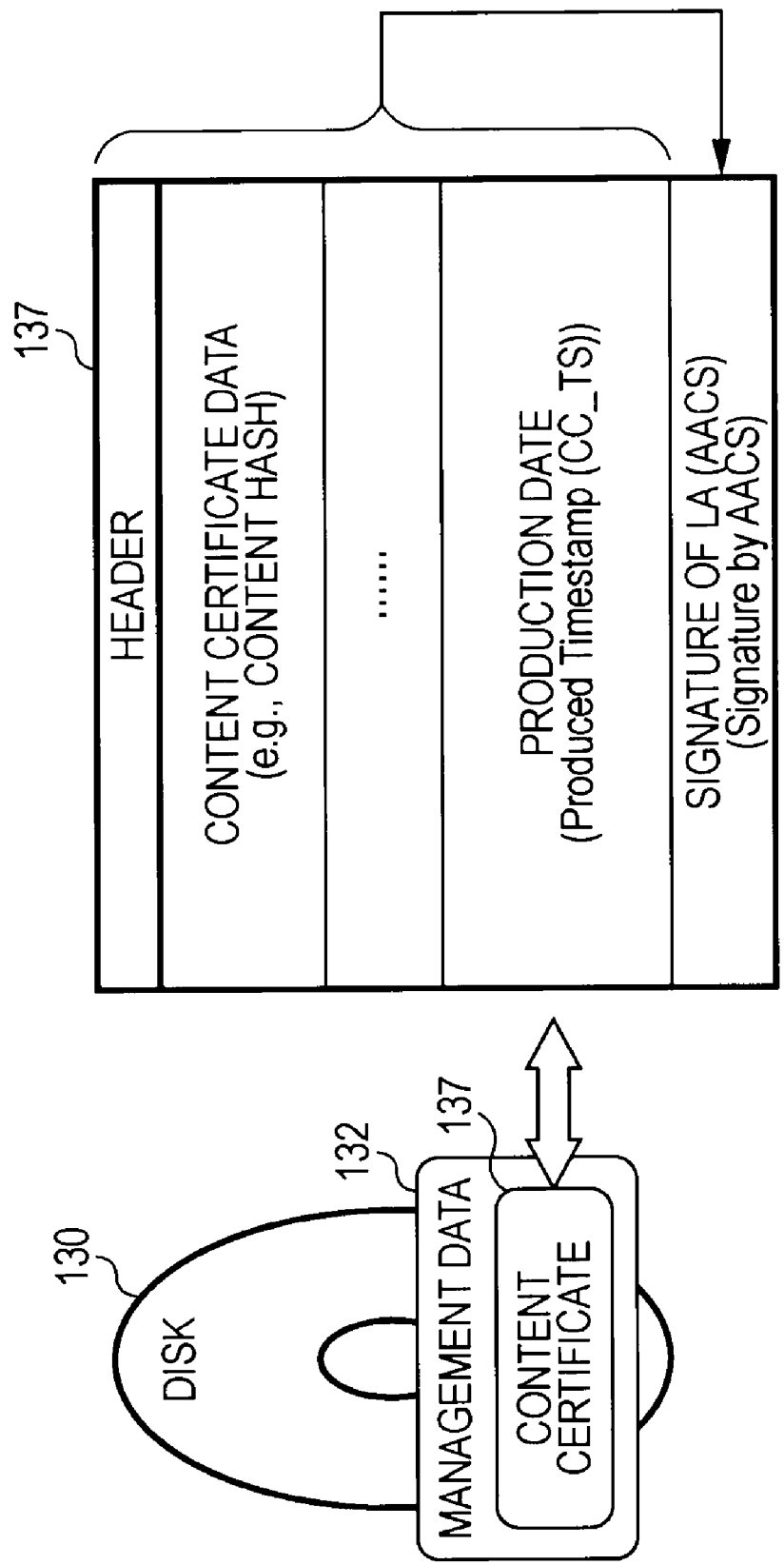
FIG. 5 illustrates an exemplary data structure of a content certificate recorded on the disk.

FIG. 5 illustrates an exemplary data structure of the content certificate recorded on the disk 130. As shown in FIG. 5, a content certificate 137 contained in the management data 132 recorded on the disk 130 includes content certificate data formed from a content hash value based on the encrypted content 133 and the production date and time data. In addition, a digital signature generated using a private key of the license authority (LA) 110 of the AACS is affixed to the content certificate data and the production date and time data.

The processing performed by the information processing apparatus 150 having the disk 130 mounted therein (see FIG. 2) is described next. As shown in FIG. 2, the information processing apparatus 150 includes a drive 151 and a data processing unit (host) 152. The drive 151 reads data from the disk 130. The data processing unit 152 receives the data recorded on the disk 130 via the drive 151 and performs data processing on the received data. Note that, although the drive 151 and the data processing unit 152 are integrated into one body in FIG. 2, the drive 151 may be externally connected to the data processing unit 152 using, for example, a USB cable.

The drive 151 reads the data recorded on the disk 130 and supplies the readout data to the data processing unit 152. At that time, in step S60 shown in FIG. 2, the drive 151 decodes (or demodulates) the encoded volume ID 131 contained in the data recorded on the disk 130 so as to generate the original volume ID 131. Thereafter, the drive 151 supplies the original volume ID 131 to the data processing unit 152.

As shown in FIG. 2, in step S30, the data processing unit 152 verifies the data recorded on the disk 130 and supplied via the drive 151. After all of the verifications are completed, the validity of the data is verified, and the validity of the ID inserter that has recorded the ID on the disk 130 is verified (Yes in step S40), the processing proceeds to step S70.

In step S70, the data processing unit 152 generates a key used for decoding the encrypted content 133, decodes the encrypted content 133, and reproduces the encrypted content 133. Note that before the processing in step S70 is performed, the drive 151 performs a volume ID generating process through the decoding process performed in step S60. Thus, the generated volume ID is used for generating the key.

However, if, in step S30, the validity of the data recorded in the disk 130 is not successfully verified (No in step S40), the processing proceeds to step S80. Accordingly, the content is not reproduced.

Figure 6:
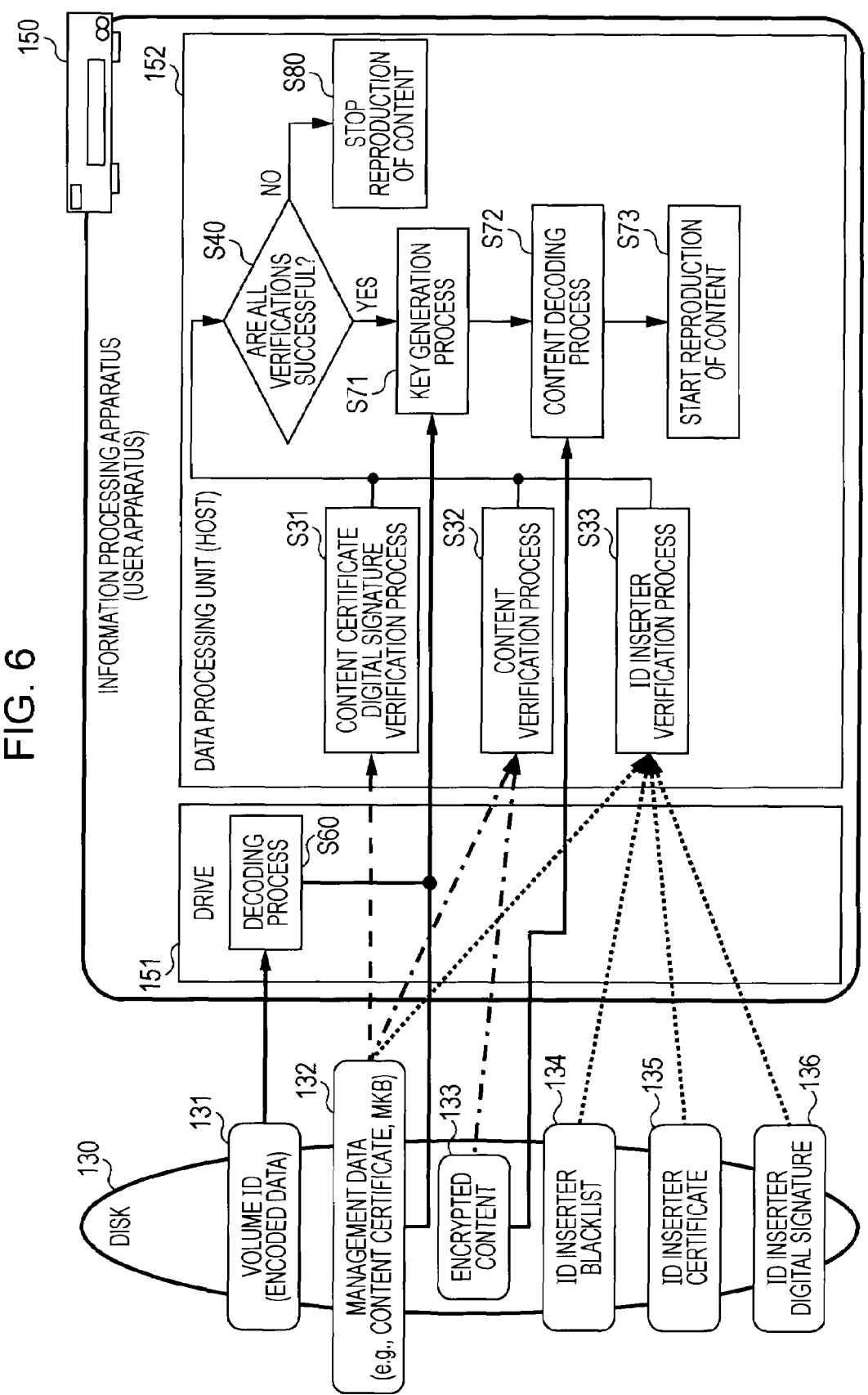
FIG. 6 illustrates an exemplary process performed by an information processing apparatus according to an embodiment of the present invention.

An exemplary data verification process performed by the data processing unit 152 of the information processing apparatus 150 and the detailed processing sequence of the content decoding process are described next with reference to FIG. 6. In FIG. 6, the disk 130 containing the content and the information processing apparatus 150 are shown. The disk 130 contains data items similar to those illustrated in FIG. 2.

The data processing unit 152 of the information processing apparatus 150 acquires the data recorded on the disk 130 via the drive 151 and performs the data verification process. In the data verification process, the validity of the data contained in the disk 130 is verified. After the validity of the ID inserter is verified, the information processing apparatus 150 decodes the encrypted content and reproduces the decrypted content.

As shown in FIG. 6, the data verification process is performed in steps S31 to S33. That is, a verification process of the content certificate is performed in step S31. A verification process of the content is performed in step S32. A verification process of the ID inserter is performed in step S33.

In the verification process of the content certificate performed in step S31, a digital signature of the license authority 110 affixed to the content certificate illustrated in FIG. 5 is verified. By applying the public key of the license authority 110, the digital signature is verified. If, through the verification process, it is verified that the content certificate is not tampered with and the identity of the signer is trusted, the processing proceeds to step S32, where a verification process of the content is performed. However, if, through the verification process, it is verified that the content certificate is tampered with or the identity of the signer is not trusted, the determination made in step S40 is "No". Accordingly, the processing proceeds to step S80, where reproduction of the content is stopped.

In the verification process of the content performed in step S32, it is verified whether the content is encrypted and whether the content is tampered with by comparing the content certificate data of the content certificate with the content data. If, through the verification process, it is determined that the content is not encrypted or that the content is tampered with, the determination made in step S40 is "No". Accordingly, the processing proceeds to step S80, where reproduction of the content is stopped.

In the ID inserter verification process performed in step S33, the validity of the ID inserter (the ID inserter 121 shown in FIG. 2) that has recorded the ID (the volume ID 131 in the present embodiment) on the disk 130 is verified. The detailed processing sequence of the ID inserter verification process performed in step S33 is described in more detail below with reference to the flowchart shown in FIG. 7.

In step S40, it is determined whether all the verifications in step S31 to S33 are successfully verified. If at least one of the verifications fails, the processing proceeds to step S80, where reproduction of the content is stopped.

However, if the validity is successfully verified in each of steps S31 to S33, the processing proceeds to step S71. In step S71, the volume ID decoded by the drive 151 is input, and the key generation information (e.g., the MKB and the CPS unit key file) are further input from the management data 132 recorded on the disk 130. Thereafter, a key used for decoding the encrypted content 133 is generated.

In step S72, the encrypted content 133 read from the disk 130 is decoded using the generated key. In step S73, the content is reproduced.

Figure 7:
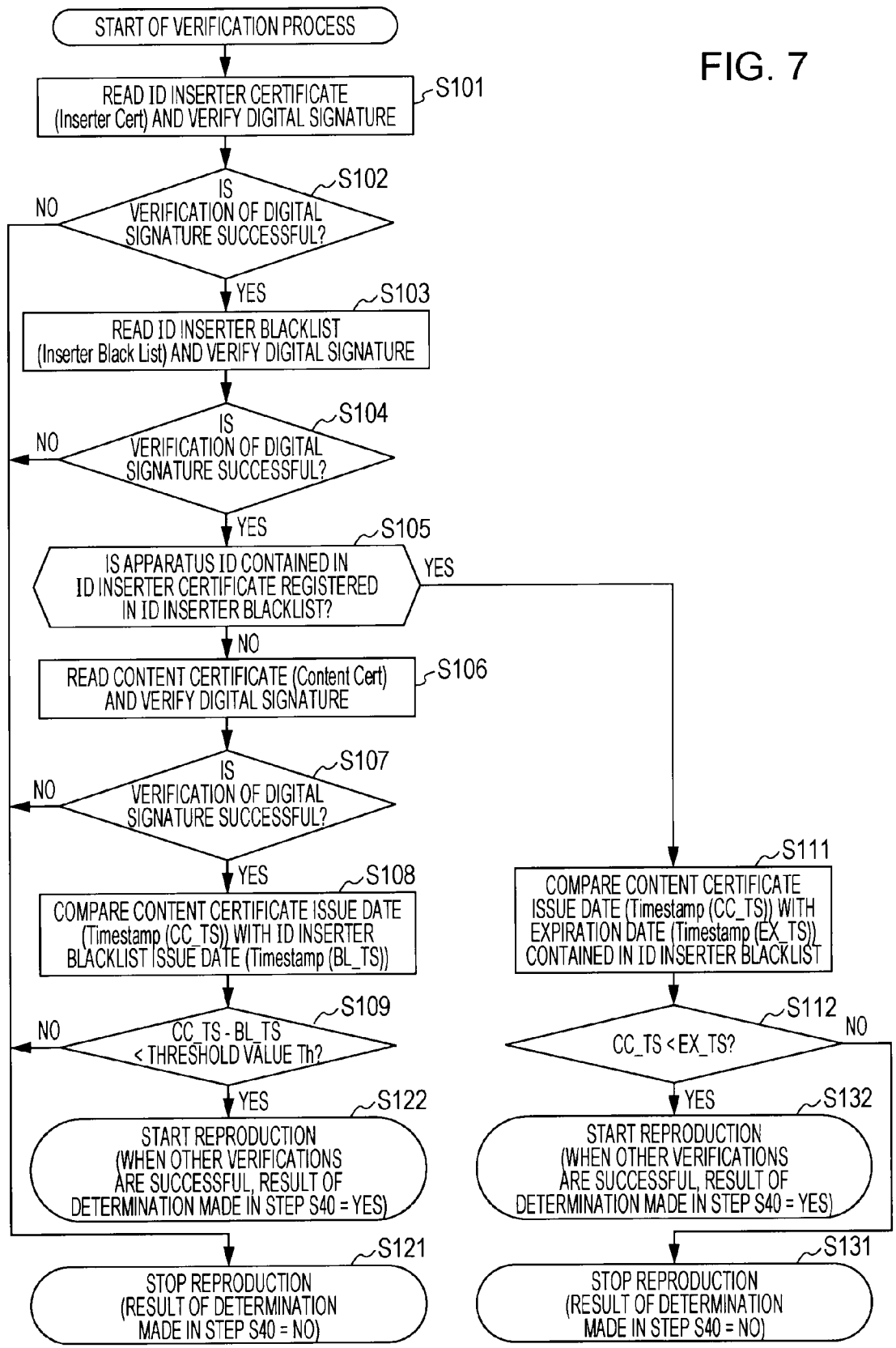
FIG. 7 is a flowchart illustrating a processing sequence of an ID inserter verification process performed by the information processing apparatus according to the embodiment.

The detailed processing sequence of the ID inserter verification process performed in step S33 is described next with reference to the flowchart shown in FIG. 7. The processing flow shown in FIG. 7 is performed by the data processing unit 152 of the information processing apparatus 150.

In step S101, the data processing unit 152 reads the ID inserter certificate from the disk 130 and verifies the digital signature. As illustrated above in FIG. 4, the ID inserter certificate includes the following data items:

(1) ID inserter certificate ID of the ID inserter that has executed ID recording (=the apparatus ID), and (2) the public key of the ID inserter that has executed ID recording.

In addition, the issue date of the ID inserter certificate and a digital signature generated using a private key of the license authority 110 are affixed to the recorded data. In step S101, the digital signature is verified. Through the verification of the digital signature, it can be verified whether the ID inserter certificate is not tampered with and whether the identity of the signer is trusted.

Note that, as shown in FIG. 4, if the ID inserter digital signature set so as to correspond to the ID inserter certificate and the additional file thereof is present, the ID inserter digital signature is verified first. If the verification of the ID inserter digital signature is successful, the digital signature of the ID inserter certificate is then verified. If the ID inserter certificate is tampered with or the identity of the signer is not trusted, reproduction of the content recorded on the disk is stopped.

However, if, in step S102, the verification of the digital signature of the ID inserter certificate is successful (Yes in step S102), that is, if the ID inserter certificate is not tampered with and, therefore, the ID inserter certificate is valid, the processing proceeds to step S103. In contrast, if, in step S102, the verification of the digital signature fails (No in step S102), that is, if the ID inserter certificate is not valid, the processing proceeds to step S121, where reproduction of the content is stopped. That is, the determination made in step S40 shown in FIG. 6 is "No", and reproduction of the content is stopped.

If, in step S102, the verification of the digital signature is successful, the ID inserter certificate is not tampered with and the identity of the signer is trusted and, therefore, the ID inserter certificate is valid. Accordingly, in step S103, the data processing unit 152 reads the ID inserter blacklist from the disk and verifies the digital signature. As illustrated in FIG. 3 above, the ID inserter blacklist includes the following data items:

(1) the apparatus ID of a revoked inserter ("Revoked Inserter Cert ID"), and (2) revocation date ("Timestamp (EX_TS)").

The two data items form a pair, and each entry contains a pair. In addition, the issue date of the blacklist and a digital signature generated using a private key of the license authority 110 are affixed to the recorded data. In step S103, this digital signature is verified. By verifying the digital signature, it can be verified whether the ID inserter blacklist is not tampered with and whether the identity of the signer is trusted.

If, in step S104, the verification of the digital signature is successful (Yes in step S104), that is, if the ID inserter blacklist is not tampered with and the identity of the signer is trusted, the processing proceeds to step S105. In contrast, if, in step S104, the verification of the digital signature fails (No in step S104), that is, if the ID inserter blacklist is not valid, the processing proceeds to step S121, where reproduction of the content is stopped. That is, the determination made in step S40 shown in FIG. 6 is "No", and reproduction of the content is stopped.

If, in step S104, the verification of the digital signature is successful, the ID inserter blacklist is not tampered with and the identity of the signer is trusted and, therefore, the processing proceeds to step S105. In step S105, it is determined whether the inserter ID contained in the ID inserter certificate is registered in the ID inserter blacklist.

If the inserter ID contained in the ID inserter certificate is not registered in the ID inserter blacklist, the processing proceeds to step S106.

In step S106, the data processing unit 152 reads the content certificate from the disk and verifies the digital signature. As illustrated in FIG. 5 above, the content certificate includes content certificate data formed from a content hash value based on the encrypted content recorded on the disk and the production date and time data. In addition, a digital signature generated using a private key of the license authority (LA) 110 of the AACS is affixed to the content certificate data and the production date and time data. In step S106, this digital signature is verified. By verifying the digital signature, it can be verified whether the content certificate is not tampered with and whether the identity of the signer is trusted.

If, in step S107, the verification of the digital signature is successful (Yes in step S107), that is, if the content certificate is not tampered with and the identity of the signer is trusted, the processing proceeds to step S108. However, if, in step S107, the verification of the digital signature fails (No in step S107), that is, if the content certificate is not valid, the processing proceeds to step S121, where reproduction of the content recorded on the disk is stopped. That is, the determination made in step S40 shown in FIG. 6 is "No", and reproduction of the content recorded on the disk is stopped.

If, in step S107, the verification of the digital signature is successful, the content certificate is not tampered with and the content certificate is valid and, therefore, the processing proceeds to step S108. In step S108, the data processing unit 152 compares the content certificate issue date (i.e., "Timestamp (CC_TS)") with the ID inserter blacklist issue date (i.e., "Timestamp (BL_TS)").

In step S109, it is determined whether the following expression is satisfied or not:

$$(CC\_TS - BL\_TS) < \text{Threshold value } (Th)$$

In this processing, it is determined whether the ID inserter blacklist issue date ("Timestamp (BL_TS)") is significantly earlier than the content certificate issue date ("Timestamp (CC_TS)"). If the blacklist is too old, the old list may be intentionally recorded on the disk. Accordingly, reproduction of the content recorded on the disk is stopped.

For example, when the threshold value Th=90 (days) and if (CC_TS−BL_TS)<90 (day) is satisfied, the difference between the content certificate issue date ("Timestamp (CC_TS)") and the ID inserter blacklist issue date ("Timestamp (BL_TS)") is less than 90 days. In such a case, the data processing unit 152 determines that the ID inserter blacklist issue date ("Timestamp (BL_TS)") is not too earlier than the content certificate issue date ("Timestamp (CC_TS)"). That is, the data processing unit 152 determines that the following two date information items recorded on the disk are relatively close to each other: the date when the validity of the content was verified and the date when the validity of the ID inserter was verified. Thus, the data processing unit 152 trusts the data of the ID inserter blacklist.

Accordingly, if the ID of the ID inserter contained in the ID inserter certificate is not registered in the ID inserter black list (No in step S105), the data processing unit 152 determines that the ID inserter that recorded the ID on the disk is valid and, subsequently, the processing proceeds to step S122. In step S122, the content is reproduced. Note that it is assumed that all of the other data verifications are successfully completed.

However, if the expression (CC_TS−BL_TS)<90 (day) is not satisfied, the difference between the content certificate issue date ("Timestamp (CC_TS)") and the ID inserter blacklist issue date ("Timestamp (BL_TS)") is greater than or equal to 90 days. In such a case, the data processing unit 152 determines that the ID inserter blacklist issue date ("Timestamp (BL_TS)") is too earlier than the content certificate issue date ("Timestamp (CC_TS)"). That is, the data processing unit 152 determines that the data of the ID inserter blacklist is not trusted.

Accordingly, even when the ID of the ID inserter contained in the ID inserter certificate is not registered in the ID inserter black list (No in step S105), the data processing unit 152 determines that it is difficult to consider that the ID inserter that recorded the ID on the disk is valid. In such a case, the processing proceeds to step S121, where reproduction of the content recorded on the disk is stopped. That is, the determination made in step S40 shown in FIG. 6 is "No", and reproduction of the content recorded on the disk is stopped.

However, if, in step S105, it is determined that the ID inserter stored in the ID inserter certificate is registered in the ID inserter black list, the processing proceeds to step S111.

In step S111, the content certificate issue date ("Timestamp (CC_TS)") is compared with the expiration date contained in the ID inserter blacklist (i.e., "Timestamp (EX_TS)").

In step S112, it is determined whether the following expression is satisfied or not:

$$CC\_TS < EX\_TS.$$

In this processing, if the expiration date contained in the ID inserter blacklist is later than the content certificate issue date ("Timestamp (CC_TS)"), it is determined that the content recorded on the disk is content recorded before the ID inserter is revoked and, therefore, the content can be reproduced without any problem. That is, if the expression CC_TS<EX_TS is satisfied, the processing proceeds to step S132, where the content is reproduced. Note that it is assumed that all of the other data verifications are successfully completed.

However, if the expiration date contained in the ID inserter blacklist is not later than the content certificate issue date ("Timestamp (CC_TS)"), it is determined that the content recorded on the disk is content recorded after the ID inserter is revoked and, therefore, the disk contains the ID recorded by an unauthorized ID inserter registered in the blacklist.

That is, if the expression CC_TS<EX_TS is not satisfied, the processing proceeds to step S131, where reproduction of the content is stopped. That is, the determination made in step S40 shown in FIG. 6 is "No", and reproduction of the content recorded on the disk is stopped.

The ID inserter verification process in step S33 shown in FIG. 6 is performed in accordance with the processing flow shown in FIG. 7.

As described above, according to the present embodiment, the information processing apparatus verifies whether the ID inserter that has recorded the ID on the disk is an unauthorized inserter using a variety of certificates recorded on the disk. Only when the validity of the ID inserter is successfully verified, can the content be reproduced. However, if the validity of the ID inserter is not verified, reproduction of the content is stopped.

The summary of the data recorded on the disk 130 and used for the verification process of the ID inserter is described below with reference to FIG. 8.

FIG. 8 illustrates the data recorded on the disk 130 and used in the ID inserter verification process performed by the data processing unit 152 of the information processing apparatus 150, that is, the data recorded on the disk 130 and used in the processing performed in step S33 shown in FIG. 6 (i.e., the processing indicated by the flowchart of FIG. 7).

In the ID inserter verification process, the following data are used: the ID inserter certificate 135, the ID inserter digital signature 136, the ID inserter black list 134, and the content certificate 137 recorded on the disk 130. Note that the processing performed on the ID inserter digital signature 136 may be eliminated. In such a case, the ID inserter digital signature 136 is not used.

The digital signature verification process is performed on at least three data items: the ID inserter certificate 135, the ID inserter black list 134, and the content certificate 137 so that it is verified that these three data items are not tampered with and, therefore, these three data items are valid data items. Subsequently, it is determined whether the ID (the apparatus ID) of the ID inserter that is recorded in the ID inserter certificate 135 is registered in the ID inserter black list 134.

If the ID (the apparatus ID) of the ID inserter contained in the ID inserter certificate 135 is not registered in the ID inserter black list 134, the processing in steps S108 to S109 of FIG. 7 is performed. That is, the content certificate issue date ("Timestamp (CC_TS)") is compared with the ID inserter blacklist issue date ("Timestamp (BL_TS)"). If (CC_TS−BL_TS)<Threshold value (Th) is satisfied, the difference between the content certificate issue date ("Timestamp (CC_TS)") and the ID inserter blacklist issue date ("Timestamp (BL_TS)") is small. In such a case, it is determined that the ID inserter blacklist issue date ("Timestamp (BL_TS)") is not too old with respect to the content certificate issue date ("Timestamp (CC_TS)"). Accordingly, the data in the ID inserter blacklist is trusted.

When this process is performed, it has already been verified that the ID of the inserter contained in the ID inserter certificate is not registered in the ID inserter blacklist. Accordingly, it is determined that the ID inserter that has recorded the ID on the disk is authorized and, therefore, reproduction of the content is started. Note that it is assumed that the other data verifications are successfully completed.

However, if (CC_TS−BL_TS)<Threshold value (Th) is not satisfied, it is determined that the ID inserter blacklist issue date ("Timestamp (BL_TS)") is too old with respect to the content certificate issue date ("Timestamp (CC_TS)"). Accordingly, the data in the ID inserter blacklist is not trusted.

In such a case, although the apparatus ID of the ID inserter contained in the ID inserter certificate is not registered in the ID inserter blacklist, the blacklist is not trusted. Accordingly, it is determined that the ID inserter that has recorded the ID may be unauthorized and, therefore, reproduction of the content is stopped.

In contrast, if the apparatus ID of the ID inserter contained in the ID inserter certificate 135 is registered in the ID inserter black list 134, the processing in steps S111 to S112 shown in FIG. 7 is performed. That is, the content certificate issue date ("Timestamp (CC_TS)") is compared with the expiration date contained in the ID inserter blacklist (i.e., "Timestamp (EX_TS)"). At that time, it is determined whether the expression CC_TS<EX_TS is satisfied.

If the expression CC_TS<EX_TS is satisfied, it is determined that the content on the disk has been recorded before the ID inserter is revoked and, therefore, reproduction of the content can be performed without any legal problem. In such a case, the reproduction of the content is started. Note that it is assumed that the other data verifications are successfully completed.

However, if the expression CC_TS<EX_TS is not satisfied, the expiration date contained in the ID inserter blacklist is not later than the content certificate issue date ("Timestamp (CC_TS)"). In such a case, it is determined that the content has been recorded on the disk after the ID inserter is revoked and, therefore, the ID is recorded by the unauthorized ID inserter registered in the blacklist. Accordingly, reproduction of the content is stopped.

By using such a configuration, the use of content on a disk having an invalid ID recorded by an unauthorized ID inserter can be prevented. While the foregoing embodiment has been described with reference to the volume ID that is unique to a content title and that serves as the ID recorded on the disk, another ID can be similarly used. For example, a media ID (or a disk ID) that is unique to a disk can be similarly used. Alternatively, the ID assigned to each of disk manufacturing lots can be used.

In addition, while the foregoing embodiment has been described with reference to a blacklist containing the apparatus IDs of revoked ID inserters, a white list containing the apparatus IDs of authorized ID inserters may be recorded on the disk, and the processing may be performed using the white list.

While the present invention has been described with reference to exemplary embodiments, it will be apparent to those of ordinary skill in the art that numerous modifications and equivalents may be made without departing from the principles and concepts of the invention as set forth in the claims. That is, it is understood that the above-described embodiments are only illustrative of the application of the principles of the present invention. The scope of the invention is, therefore, indicated by the appended claims rather than by the foregoing description.

The above-described series of processes can be executed by hardware, software, and a combination thereof. When the above-described series of processes are executed by software, the programs of the software can be installed in a memory of a computer incorporated in dedicated hardware or in a general-purpose computer that can execute a variety of processes. For example, the programs can be prerecorded in a recording medium. In addition to installing the programs in the computer from the recording medium, the programs can be received via a network, such as a local area network (LAN) or the Internet, and can be installed in a recording medium (e.g., a hard disk) incorporated in the computer.

The above-described various processes are executed in the above-described sequence. However, the processes may be executed in parallel or independently in accordance with the processing power of the apparatuses that execute the processes and the necessity. The term "system" refers to a logical combination of a plurality of apparatuses. The apparatuses having a variety of configuration are not necessarily included in one body.

The present application contains subject matter related to that disclosed in Japanese Priority Patent Application JP 2008-213538 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a data processing unit configured to verify data recorded on a disk and reproduce content recorded on the disk if a verification condition is satisfied; wherein the data processing unit verifies the validity of an ID inserter that has recorded, on the disk, an ID corresponding to the disk, and wherein the data processing unit acquires, from the disk, an ID inserter certificate containing an apparatus ID of the ID inserter that has recorded the ID corresponding to the disk on the disk and an ID inserter blacklist having apparatus IDs of invoked ID inserters registered therein, determines whether the apparatus ID contained in the ID inserter certificate is registered in the ID inserter blacklist so as to verify the validity of the ID inserter that has recorded, on the disk, the ID corresponding to the disk, and stops reproduction of the content recorded on the disk if it is determined that the ID inserter is not valid,
wherein, when the apparatus ID contained in the ID inserter certificate is registered in the ID inserter blacklist, the data processing unit reads a content certificate that is recorded on the disk and that certifies the validity of the content and compares a content certificate issue date contained in the content certificate with an expiration date of the validity of the ID inserter contained in the ID inserter blacklist, and wherein, if an expiration date of the validity of the ID inserter is earlier than the content certificate issue date, the data processing unit stops reproduction of the content recorded on the disk.

2. The information processing apparatus according to claim 1, wherein the data processing unit verifies a digital signature of the ID inserter certificate and a digital signature of the ID inserter blacklist, and wherein, if the data processing unit is unable to verify that the ID inserter certificate and the ID inserter blacklist are not tampered with and the identity of a signer of the digital signature is trusted, the data processing unit stops reproduction of the content recorded on the disk.

3. The information processing apparatus according to claim 1, wherein the data processing unit verifies a digital signature of the content certificate, and wherein, if the data processing unit is unable to verify that the content certificate is not tampered with and the identity of a signer of the digital signature is trusted, the data processing unit stops reproduction of the content recorded on the disk.

4. The information processing apparatus according to claim 1, wherein the disk further contains an ID inserter digital signature representing signature data based on a private key of the ID inserter for data including the ID inserter certificate, and wherein the data processing unit verifies the ID inserter digital signature, and wherein, if the data processing unit is unable to verify that the data is not tampered with and an identity of a signer of the digital signature is trusted, the data processing unit stops reproduction of the content recorded on the disk.

5. The information processing apparatus according to claim 1, wherein the ID corresponding to the disk is a volume ID that is unique to a title of the content recorded on the disk.

6. An information processing apparatus comprising:
a data processing unit configured to verify data recorded on a disk and reproduce content recorded on the disk if a verification condition is satisfied;
wherein the data processing unit verifies the validity of an ID inserter that has recorded, on the disk, an ID corresponding to the disk, and wherein the data processing unit acquires, from the disk, an ID inserter certificate containing an apparatus ID of the ID inserter that has recorded the ID corresponding to the disk on the disk and an ID inserter blacklist having apparatus IDs of invoked ID inserters registered therein, determines whether the apparatus ID contained in the ID inserter certificate is registered in the ID inserter blacklist so as to verify the validity of the ID inserter that has recorded, on the disk, the ID corresponding to the disk, and stops reproduction of the content recorded on the disk if it is determined that the ID inserter is not valid,
wherein, when the apparatus ID contained in the ID inserter certificate is not registered in the ID inserter blacklist, the data processing unit reads a content certificate that is recorded on the disk and that certifies the validity of the content and compares a content certificate issue date contained in the content certificate with an issue date of the ID inserter blacklist, and wherein, when the issue date of the ID inserter blacklist is earlier than the content certificate issue date and if a difference between the issue date of the ID inserter blacklist and the content certificate issue date is greater than or equal to a predetermined threshold value, the data processing unit stops reproduction of the content recorded on the disk.

7. A disk storing:
content;
An ID corresponding to the disk;
an ID inserter certificate containing an apparatus ID of an ID inserter that has recorded the ID corresponding to the disk on the disk; and
an ID inserter blacklist having apparatus IDs of invoked ID inserters registered therein,
wherein an information processing apparatus that reproduces the content determines whether the apparatus ID contained in the ID inserter certificate is registered in the ID inserter blacklist so as to verify the validity of the ID inserter that has recorded, on the disk, the ID corresponding to the disk, and stops reproduction of the content recorded on the disk if it is determined that the ID inserter is not valid, and wherein, when the apparatus ID contained in the ID inserter certificate is registered in the ID inserter blacklist, the information processing apparatus reads a content certificate that is recorded on the disk and that certifies the validity of the content and compares a content certificate issue date contained in the content certificate with an expiration date of the validity of the ID inserter contained in the ID inserter blacklist, and wherein, if an expiration date of the validity of the ID inserter is earlier than the content certificate issue date, the information processing apparatus stops reproduction of the content recorded on the disk.

8. An information processing method for use in an information processing apparatus, comprising the step of:

verifying data recorded on a disk and, if a verification condition is satisfied, reproducing content recorded on the disk using a data processing unit of the information processing apparatus;

wherein the step of verifying data recorded on the disk and reproducing content recorded on the disk involves acquiring an ID inserter certificate containing an apparatus ID of the ID inserter that has recorded the ID corresponding to the disk on the disk and an ID inserter blacklist having apparatus IDs of invoked ID inserters registered therein and determining whether the apparatus ID contained in the ID inserter certificate is registered in the ID inserter blacklist so as to verify the validity of the ID inserter that has recorded, on the disk, the ID corresponding to the disk and stopping reproduction of the content recorded on the disk if it is determined that the ID inserter is not valid, and wherein, the step of verifying data recorded on the disk and reproducing content recorded on the disk further involves, when the apparatus ID contained in the ID inserter certificate is registered in the ID inserter blacklist, reading a content certificate that is recorded on the disk and that certifies the validity of the content and comparing a content certificate issue date contained in the content certificate with an expiration date of the validity of the ID inserter contained in the ID inserter blacklist, and, if an expiration date of the validity of the ID inserter is earlier than the content certificate issue date, stopping reproduction of the content recorded on the disk.

9. A non-transitory computer readable medium storing thereon a program for causing an information processing apparatus to perform data processing, comprising:

program code for causing a data processing unit of the information processing apparatus to perform a step of verifying data recorded on a disk and reproducing content recorded on the disk if a verification condition is satisfied;

wherein the step of verifying data recorded on a disk and reproducing content recorded on the disk involves acquiring an ID inserter certificate containing an apparatus ID of the ID inserter that has recorded the ID corresponding to the disk on the disk and an ID inserter blacklist having apparatus IDs of invoked ID inserters registered therein and determining whether the apparatus ID contained in the ID inserter certificate is registered in the ID inserter blacklist so as to verify the validity of the ID inserter that has recorded, on the disk, the ID corresponding to the disk and stopping reproduction of the content recorded on the disk if it is determined that the ID inserter is not valid, and wherein, the step of verifying data recorded on the disk and reproducing content recorded on the disk further involves, when the apparatus ID contained in the ID inserter certificate is registered in the ID inserter blacklist, reading a content certificate that is recorded on the disk and that certifies the validity of the content and comparing a content certificate issue date contained in the content certificate with an expiration date of the validity of the ID inserter contained in the ID inserter blacklist, and, if an expiration date of the validity of the ID inserter is earlier than the content certificate issue date, stopping reproduction of the content recorded on the disk.

* * * * *